(12) United States Patent
Mathews et al.

(10) Patent No.: US 11,566,743 B2
(45) Date of Patent: *Jan. 31, 2023

(54) METHOD FOR MINIMIZING MATERIAL MIXING DURING TRANSITIONS IN A MATERIAL PROCESSING SYSTEM

(71) Applicant: Tropicana Products, Inc., Bradenton, FL (US)

(72) Inventors: Jeffrey D. Mathews, Naperville, IL (US); Gerald Olean Fountain, Wilmette, IL (US); Johnny Casasnovas, Barrington, IL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,809

(22) Filed: Dec. 9, 2021

(65) Prior Publication Data

US 2022/0099234 A1 Mar. 31, 2022

Related U.S. Application Data

(62) Division of application No. 16/782,818, filed on Feb. 5, 2020, now Pat. No. 11,226,062.

(Continued)

(51) Int. Cl.
*B65G 53/50* (2006.01)
*F16L 55/38* (2006.01)

(52) U.S. Cl.
CPC .................................. *F16L 55/38* (2013.01)

(58) Field of Classification Search
None
See application file for complete search history.

(56) References Cited

U.S. PATENT DOCUMENTS

| | | | |
|---|---|---|---|
| 3,135,278 A | * | 6/1964 | Foord ...................... F17D 3/08 137/15.07 |
| 3,883,431 A | | 5/1975 | Ishii et al. |

(Continued)

FOREIGN PATENT DOCUMENTS

| | | |
|---|---|---|
| CN | 1533827 | 10/2004 |
| EP | 1074183 | 2/2001 |

(Continued)

OTHER PUBLICATIONS

Takadono et al., "Treatment of highly fouling waste waters with tubular membrane systems," Desalination, vol. 49, 3 (347-355), 1984.

(Continued)

*Primary Examiner* — Joseph A Dillon, Jr.
(74) *Attorney, Agent, or Firm* — Barnes & Thornburg LLP; G. Peter Nichols

(57) ABSTRACT

A method of minimizing material mixing in a piping system during a transition between a first material and a second material includes providing a plurality of pipe pigs in a first pipe section with the plurality of pipe pigs being sufficient to substantially fill a cross-section of the first pipe section and to define a plug having a leading edge and a trailing edge such that the leading edge is in contact with a first material and the trailing edge is in contact with a second material. Each pipe pig has a nominal size that is smaller than an effective diameter of the first pipe section. The plug is moved through the piping system by moving the second material. Advantageously, mixing of the first material and the second material is inhibited by the plug.

18 Claims, 5 Drawing Sheets

Related U.S. Application Data

(60) Provisional application No. 62/806,935, filed on Feb. 18, 2019.

(56) References Cited

U.S. PATENT DOCUMENTS

| | | | |
|---|---|---|---|
| 3,938,912 A | | 2/1976 | Sakamoto et al. |
| 4,216,026 A | | 8/1980 | Scott |
| 4,383,783 A | * | 5/1983 | Kruka ............... F16L 55/42 106/266 |
| 4,473,408 A | * | 9/1984 | Purinton, Jr. ......... E21B 37/06 134/8 |
| 4,767,603 A | | 8/1988 | Byrd et al. |
| 4,895,602 A | | 1/1990 | Sagawa |
| 4,898,197 A | | 2/1990 | Barry |
| 5,105,843 A | | 4/1992 | Condron |
| 5,265,303 A | * | 11/1993 | Neff ................. B08B 9/0557 15/104.061 |
| 5,300,151 A | | 4/1994 | Lowther |
| 5,300,152 A | | 4/1994 | Lowther |
| 5,592,990 A | | 1/1997 | Ben-Dosa |
| 5,993,562 A | | 11/1999 | Roelofs et al. |
| 6,183,216 B1 | | 2/2001 | Bachner |
| 6,458,405 B1 | | 10/2002 | Soumya et al. |
| 6,841,070 B2 | | 1/2005 | Zha et al. |
| 6,916,383 B2 | | 7/2005 | Quarini |
| 7,183,239 B2 | | 2/2007 | Smith et al. |
| 7,485,343 B1 | | 2/2009 | Branson et al. |
| 7,739,767 B2 | * | 6/2010 | Galloway ............ F16L 55/46 15/104.061 |
| 8,273,693 B2 | | 9/2012 | Schwartz |
| 8,616,236 B2 | | 12/2013 | Burden |
| 8,741,158 B2 | | 6/2014 | Aytug et al. |
| 9,636,721 B2 | | 5/2017 | Ovnic |
| 10,220,424 B2 | * | 3/2019 | Ervin ................. B08B 9/0551 |
| 10,689,192 B2 | | 6/2020 | Sundholm |
| 11,306,859 B2 | * | 4/2022 | Casasnovas ........... F16L 55/11 |
| 2003/0008054 A1 | | 1/2003 | Gordon et al. |
| 2003/0140994 A1 | | 7/2003 | Kneisl |
| 2005/0233046 A1 | | 10/2005 | Krawczyk et al. |
| 2009/0140133 A1 | | 6/2009 | Abney |
| 2011/0011299 A1 | | 1/2011 | Beck |
| 2016/0001337 A1 | | 1/2016 | Ervin |
| 2017/0304880 A1 | * | 10/2017 | Ervin ................. B08B 9/0551 |
| 2018/0020698 A1 | | 1/2018 | Zhu et al. |
| 2019/0016532 A1 | | 1/2019 | Sundholm |
| 2021/0080044 A1 | | 3/2021 | Casasnovas |

FOREIGN PATENT DOCUMENTS

| | | | | |
|---|---|---|---|---|
| EP | 1306140 | | 5/2003 | |
| EP | 2078460 | | 7/2009 | |
| GB | 1428615 A | * | 3/1976 | ............ B65G 53/30 |
| GB | 1484562 | | 9/1977 | |
| JP | 2018001135 | | 1/2018 | |
| WO | 95/14205 | | 5/1995 | |
| WO | 01/51224 | | 7/2001 | |
| WO | WO-2021029774 A1 | * | 2/2021 | ............ B01D 5/009 |
| WO | WO-2022084510 A1 | * | 4/2022 | |

OTHER PUBLICATIONS

Walkers, "Separation anxiety: membrane cleaning in the 21st century," AOCS (9 pages), 2015.

"Investigation of Low-Pressure Membrane Performance, Cleaning, and Economics Using a Techno-Economic Modeling Approach," Science and Technology Program Report No. 174 (152 pages), 2012.

International Preliminary Report dated Aug. 26, 2021 in Application No. PCT/US2020/016818.

International Search Report, PCT/EP2018/056268 dated May 13, 2020.

International Written Opinion, PCT/EP2018/056268 dated May 13, 2020.

U.S. Appl. No. 16/782,818, filed Feb. 5, 2020.

International Search Report and Written Opinion issued in PCT/US2021/065328 dated Jun. 28, 2022.

Office Action dated Sep. 20, 2022 in Chinese Appl. No. 2020800150318.

* cited by examiner

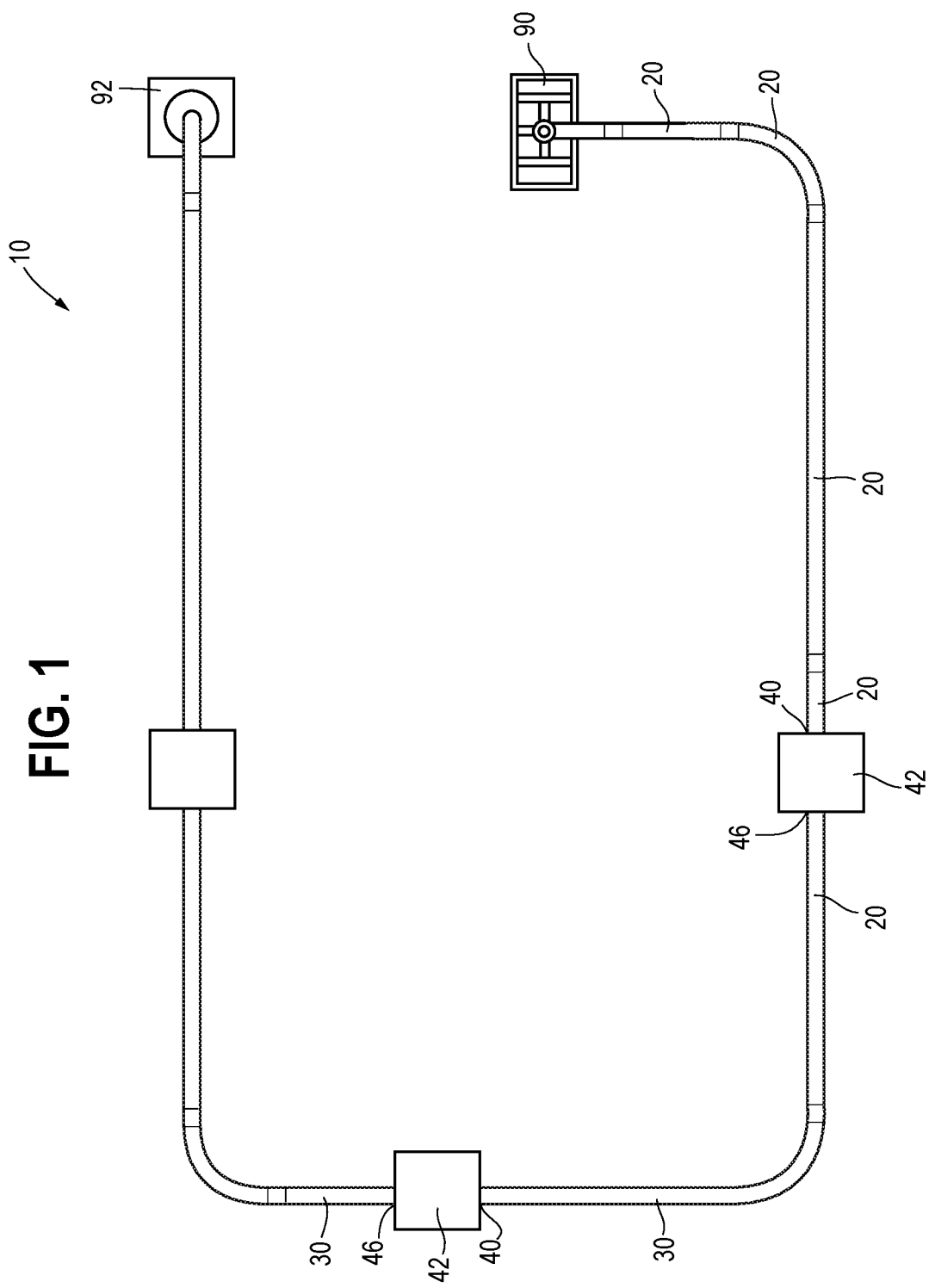

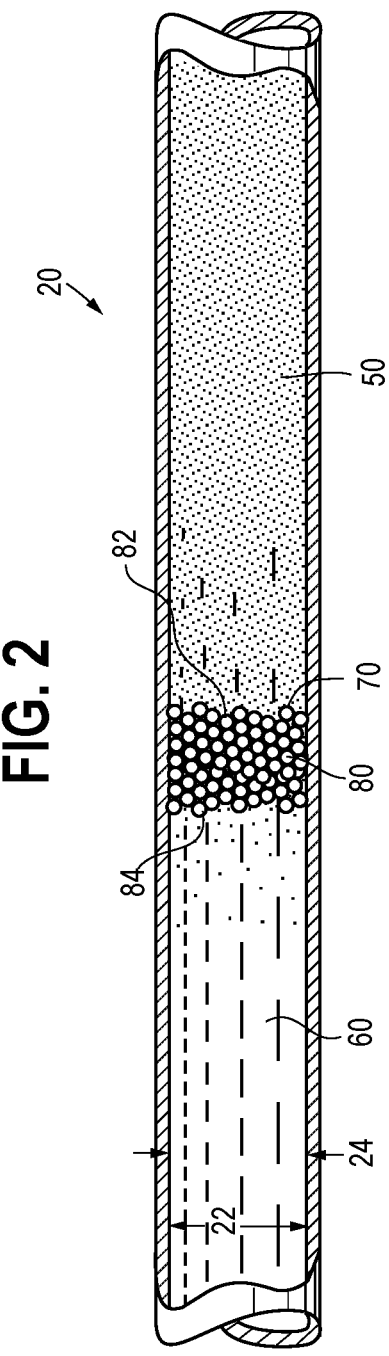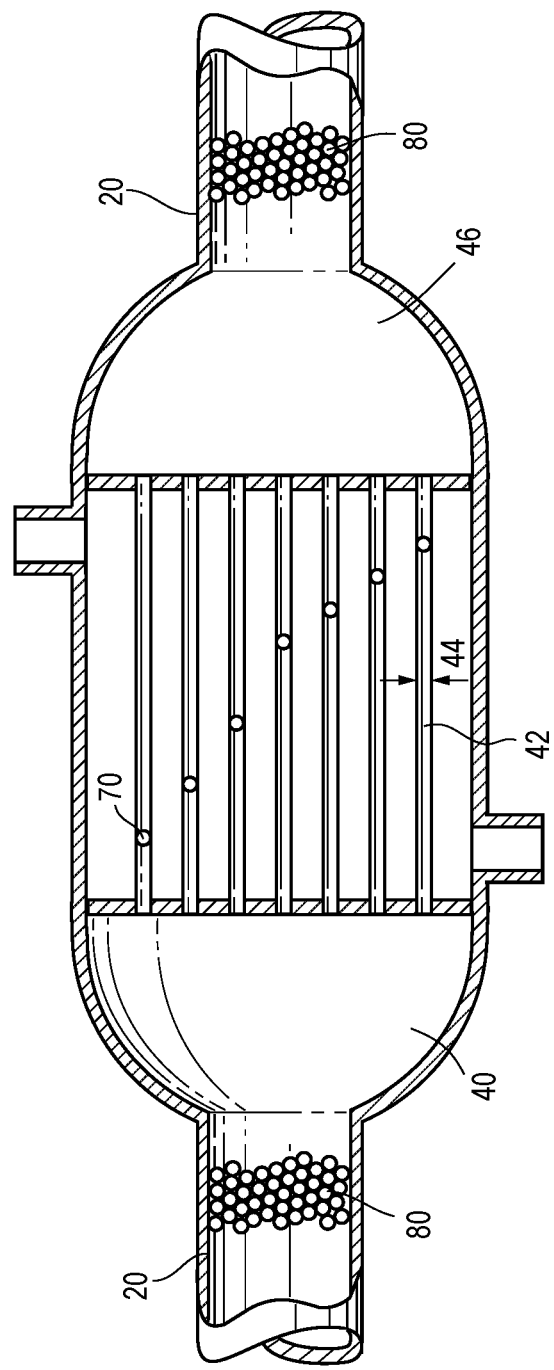

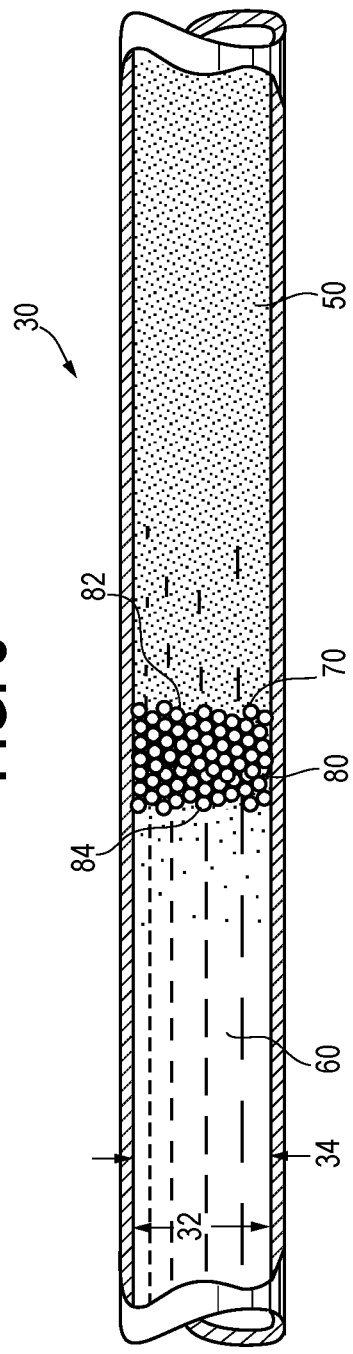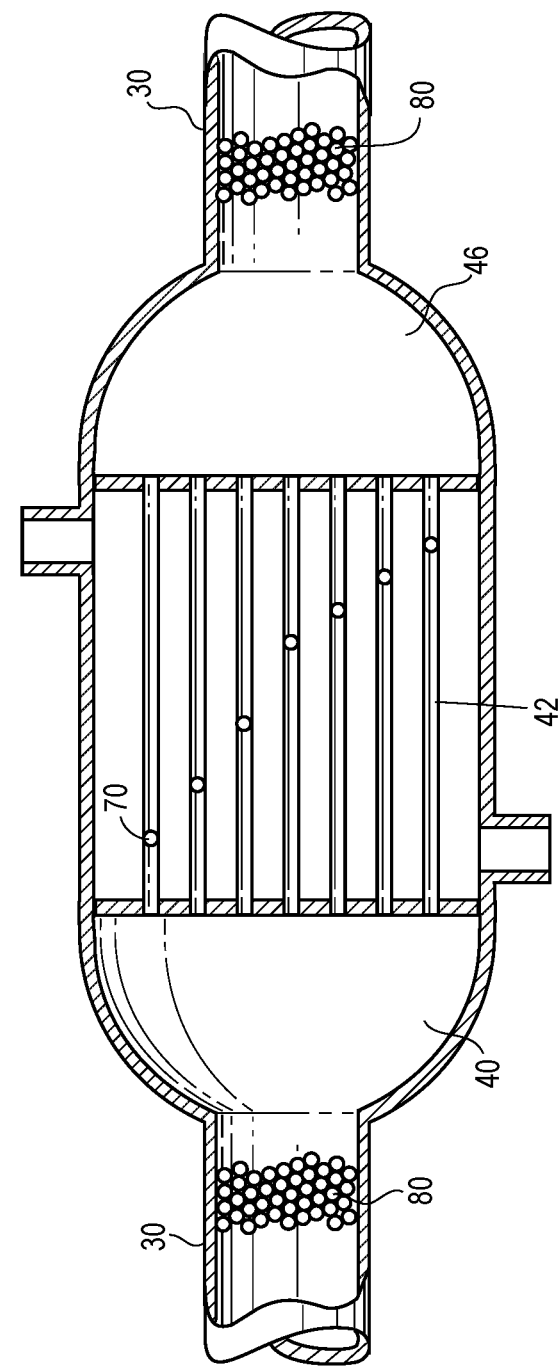

METHOD FOR MINIMIZING MATERIAL MIXING DURING TRANSITIONS IN A MATERIAL PROCESSING SYSTEM

This application is a divisional application of U.S. application Ser. No. 16/782,818 filed Feb. 5, 2020, which claims the benefit of U.S. Application No. 62/806,935 filed Feb. 18, 2019, the entire contents of both are incorporated herein by reference.

The present disclosure relates to processes and systems for minimizing material mixing during transitions in material processing systems.

BACKGROUND

In material processing systems such as in food processing systems, there is a desire to improve processing yields and to decrease the time required to transition from a material currently being processed to a different material to be processed. These desires are particularly important when the material processing system is subject to frequent production changes. Further, there is a desire to minimize the environmental impact of waste streams related to blending of the materials during transitions.

Food manufacturers are being driven to improve processing yields through increasing pressure on costs and profitability, while addressing smaller batch sizes dictated by increased consumer variety with more frequent production changes.

Having advanced from artisan production methods, many types of food production now employ a high degree of automation, and so production of foods such as desserts, ready meals, condiments, dairy and juice products, and many others involve passing both ingredients and the finished product along a network of pipes during manufacturing before they reach the packing stations. Depending on the physical layout of the manufacturing site the routing of some of this pipework can be quite long, with several hundreds of meters not uncommon.

Further, in many situations, the piping system may include bends in the system, changes in the effective diameter of fluidly connected pipes, and the presence of equipment having multiple tubes or flow passages, such as heat exchangers or similar types of apparatuses.

At the end of a production batch, when the material processing system has to switch to another product or at the end of a production run prior to cleaning, the system will typically contain the material that was being processed, which typically holds a tangible financial value and an unwelcome cleaning (clean-in-place, CIP) challenge.

Recovering that material in most instances may be an economic or environmental desire. The unit cost of ingredients may be small; but if there are a thousand liters potentially lost in the system, and perhaps four or more product changes every day, the value of product to be recovered starts to appear as a significant cost. For a marginal product even a small cost saving and increase in yield has the potential to make a substantial impact on profitability.

Accordingly, there is a need for a method that can reduce the time between transitions of a first material and a second material as well as for a method that minimizes or inhibits the mixing of the first material and the second material during transitions, which will have an impact on the amount of the first and second material lost to waste.

SUMMARY

According to one aspect of the disclosure, a method is provided to inhibit or minimize mixing of materials in a piping system during a transition between a first material and a second material. The piping system can be used for processing material or it may be used as a portion or subsystem of a plant or system for processing material.

In one aspect, the piping system is used for processing food material. The food material may be solid, semi-solid, or liquid. In one embodiment, the piping system is used to process juice such as orange juice, grapefruit juice, lemon juice, apple juice and the like.

Material transitions may occur because of the need for periodic cleaning, because the system is required to process a different material than that currently being processed, or because of some other reason. In any event, the piping system may contain a first material and it is desired to remove the first material from the piping system and replace it with a second material. One of skill will appreciate that an exemplary transition would occur when the system is processing a first material and the piping system needs to be cleaned. In this instance, the second material may include a cleaning fluid. To minimize the amount of the first material that is sent to waste, it would be desirable to minimize the amount of mixing between the first material and the second material, e.g., the cleaning fluid. At the same time, it would be desirable to provide a cleaning fluid at the greatest concentration practical without being diluted by the first material.

As noted above, the first material may be a solid, semi-solid, fluid (gas or liquid), slurry, powder, or any substance that can be conveyed. In addition, the second material may be a solid, semi-solid, fluid (gas or liquid), slurry, powder, or any substance that can be conveyed. In certain embodiments, the first material and the second material are the same type, e.g., both are liquids.

The piping system may have a number of connected pipes that may or may not include bends or other transitions from one end of the piping system to the other end. An example of a transition would be from a smaller diameter pipe to a larger diameter pipe and vice versa.

The piping system may include a first pipe with a first effective diameter and a second pipe fluidly connected with the first pipe and having a second effective diameter that may be the same as or different than the effective diameter of the first pipe.

As used in this application, the term "pipe" refers to a structure that is configured to convey substances that can flow—fluids (liquids and gases), slurries, powders or other substances that are sought to be conveyed. Also, the term "pipe" as used in this application includes open structures such as a trough as well as closed structures such as a cylindrical tube. However, the term "pipe" refers to a structure having any shape suitable to convey substances that can flow.

As used in this application, "in fluid connection" or "fluidly connected" refers to pipes that are connected in a manner such that if a fluid was present in the pipes, the fluid is able to move through the pipes. One of skill will appreciate that if the material is a solid and it is moved through fluidly connected pipes, the solid would traverse the pipes forming the piping system.

The term "effective diameter" refers to a measure such that the area of a non-circular cross section pipe would be approximately the same as the area of a circular cross section pipe. One of skill will appreciate that the "effective diameter" is typically applicable in those instances where the pipe has a non-circular cross section. Further, one of skill will appreciate that, if the pipe has a circular cross section, the "effective diameter" is equal to the diameter of the pipe.

The piping system may also include portions that contain a plurality of flow passages. In some instances, those portions may be fluidly connected to an inlet manifold that is in fluid communication with a plurality of flow passages that terminate at an outlet manifold having a single outlet fluidly connected to other portions of the piping system. An example of such, would be a heat exchanger, pasteurizer, or membrane filtration system. The heat exchanger or pasteurizer may be a single pass, double pass, or multiple pass and may also be a straight-through design or a U-tube design, or some other type of design, such as plate and frame heat exchanger. One of skill would appreciate that one or more heat exchangers, pasteurizers, membrane filtration systems, or other pieces of processing equipment may be provided in the piping system.

As used in this application, the term "flow passage" or flow passages" refers to an arrangement of a plurality of structures that are configured to convey substances that can flow—fluids (liquids and gases), slurries, powders or other substances that are sought to be conveyed. Non-limiting examples of flow passages would be the tubes present in a shell and tube type exchanger, where a flow passage would be an individual tube of the shell and tube exchanger.

In one aspect, the first pipe includes a plurality of flow passages. In other aspect, the second pipe includes a plurality of flow passages. In yet another aspect, both the first pipe and the second pipe include a plurality of flow passages. Typically, each flow passage has substantially the same effective diameter. The effective diameter of each flow passage may be smaller than, substantially the same as, or larger than the first effective diameter and/or the second effective diameter. In one embodiment, the effective diameter of each flow passage is smaller than the first effective diameter and the second effective diameter.

The method includes providing a plurality of pipe pigs in the first pipe. In one embodiment, each pipe pig has a nominal size that is smaller than the first effective diameter. The pipe plugs may have any suitable shape consistent with the shape of the pipes in the piping system. In one embodiment, the pipe pigs are generally spherical. The pipe pigs may have a nominal size (i.e., with a diameter) that is smaller than the effective diameter of the flow passages, substantially the same size as the effective diameter of the flow passages, or slightly larger than the effective diameter of the flow passages. Advantageously, the pipe pigs are configured such that at least one pipe pig passes through each flow passage.

In some embodiments, the pipe pigs may be compressible so that as the pipe pigs pass through the flow passages, the pipe pigs will be slightly compressed. In other embodiments, the pipe pigs are fluid impermeable or fluid permeable. In still other embodiments, each pipe pig is neutrally buoyant in the first material, the second material or both materials. Neutrally buoyant refers to a condition in which the average density of the pipe pig is substantially equal to the density of the fluid in which the pipe pig is immersed.

The plurality of pipe pigs provided will be sufficient to substantially fill a cross-section of the first effective diameter of the first pipe and/or a cross-section of the second pipe so that a plug is defined. The plug has a leading edge and a trailing edge. The leading edge is in contact with the first material and the trailing edge is in contact with the second material. After the plug is defined, the plug is moved through the piping system by providing the second material in contact with the trailing edge of the plug. The second material is moved through the first pipe and any subsequent or downstream piping and/or manifolds, e.g., the second pipe, to push or move the pipe pigs through the piping system.

In one embodiment, the plug is defined and configured such that mixing between the first material and the second material is inhibited or minimized. The inhibition of mixing is such that the amount of the first material present at the trailing edge of the plug is about 10% or less by volume. In some embodiments, the inhibition of mixing is such that the amount of the second material present at the leading edge of the plug is about 10% or less by volume. In other embodiments, the inhibition of mixing is such that the amount of the first material present at the trailing edge of the plug is about 10% or less by volume and the amount of the second material present at the leading edge of the plug is about 10% or less by volume.

One of skill may appreciate that the described system and method may be effective to clean the interior walls of the piping system and any associated flow passages while minimizing the mixing between the first material and the second material.

BRIEF DESCRIPTION OF THE DRAWINGS

The following description accompanies the drawings, all given by way of non-limiting examples that may be useful to understand how the described process and system may be embodied.

FIG. 1 is a top plan view of an exemplary piping system that is part of a material processing system and for which the method of this disclosure can be practiced.

FIG. 2 is a schematic drawing showing a portion of a first pipe with a plurality of pipe pigs sufficient to define a plug.

FIG. 3 is a schematic drawing showing a portion of the first pipe that includes a plurality of flow passages.

FIG. 5 is a schematic drawing showing a portion of a second pipe with a plurality of pipe pigs sufficient to define a plug.

FIG. 6 is a schematic drawing showing a portion of the second pipe that includes a plurality of flow passages.

DESCRIPTION

Figure 4:
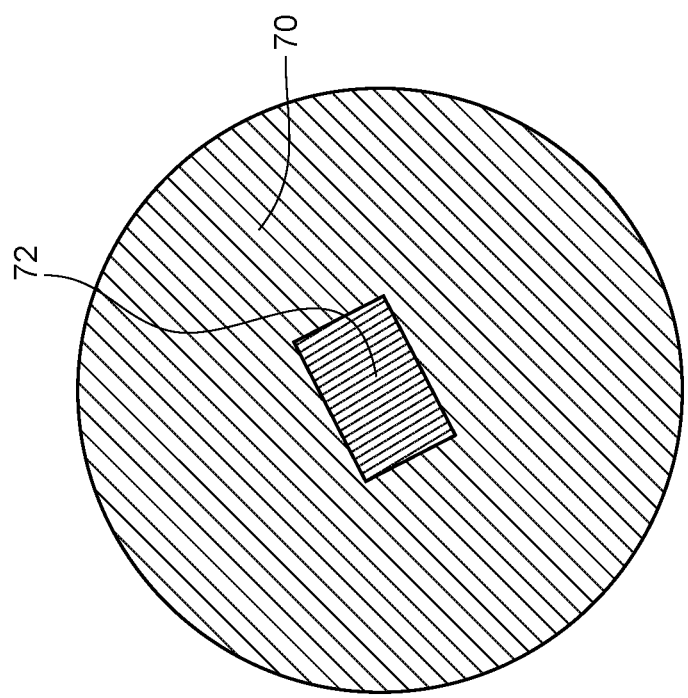
FIG. 4 is a cross sectional view of one embodiment of a pipe pig having an embedded locating device.

The disclosure provides different embodiments of a material processing piping system that can be used for material processing and/or that forms part of a system used for material processing. The elements or portions of the piping system are referred to as pipes, tubes, tube sections, or ducts in this description. The interior surface is referred to as a pipe wall or tube wall. The piping system may be used for a wide variety of materials including but not limited to solids, semi-solids, and liquids such as but not limited to food and non-food-related products such as edible and non-edible food products including meats, pastes, sauces, cereals, vegetables, fruits, dairy, cosmetics, pharmaceuticals and the like.

Generally, the material processing system may be used to process one or more differing types of products and therefore, the material processing system typically needs to be cleaned or flushed before a new material can be processed. The disclosed method advantageously accomplishes the transition between the material being processed and another material such as a cleaning material or another material to be processed while inhibiting the mixing between the materials. As a result, material and cost savings are realized.

Referring to FIG. 1, an exemplary schematic piping system 10 that can be used for material processing and/or forms part of a system used for material processing is shown. The piping system 10 can be part of a food or beverage processing facility, a pharmaceutical plant, a chemical plant, or any known type of material processing plant. The piping system 10 is typically used within these facilities to convey product from one location to another. The piping system 10 includes a plurality of individual tube sections or pipes connected together to form a continuous conduit or piping system 10. For example, the piping system may include a plurality of first pipes or tube sections 20 and a plurality of second pipes or tube sections 30 with each of the first pipe sections 20 fluidly connected to each other, with first pipe sections 20 fluidly connected to second pipe sections 30, and with second pipe sections 30 being fluidly connected to each other. One of skill will appreciate that there may be other pipe sections fluidly connected to the second pipe sections 30 (and connected to each other).

The connections or methods of joining individual tube sections or pipes may include external compression clamps, compression couplings, sanitary flanges, or welded joints as well as other methods of joining tube sections. The arrangement of tube sections or pipes 20, 30 shown in FIG. 1 is exemplary and not limiting. The system and method of this disclosure may be used with a wide variety of system configurations including those that only include straight tube sections as well as those that include rises, falls, and turns. In addition, the system and method may be used with different turn radii, different numbers and different configurations of corners, different tubing materials, and different tube lengths.

Generally and in one embodiment, the piping system 10 is made with pipes or tube sections 20, 30 that are cylindrical; however, it is contemplated that the method can be used in piping systems where the pipes or tube sections 20, 30 are not cylindrical but have a shape other than cylindrical. In these instances, the pipes or tube sections 20, 30 may be considered to have an "effective diameter".

The term "effective diameter" refers to a measure such that the area of a non-circular cross section pipe would be approximately the same as the area of a circular cross section pipe. One of skill will appreciate that the "effective diameter" is typically applicable in those instances where the pipe has a non-circular cross section. Further, one of skill will appreciate that, if the pipe has a circular cross section, the "effective diameter" is equal to the diameter of the pipe.

The system and method may be used with pipes or tube sections having the same or different effective diameters. For example, the piping system may include a first pipe or tube section 20 having a first effective diameter 22 fluidly connected with second pipe or tube section 30 having a second effective diameter 32. In this instance, the second effective diameter 32 may be smaller than, substantially the same as, the same as, or greater than the first effective diameter 22.

Figure 7:
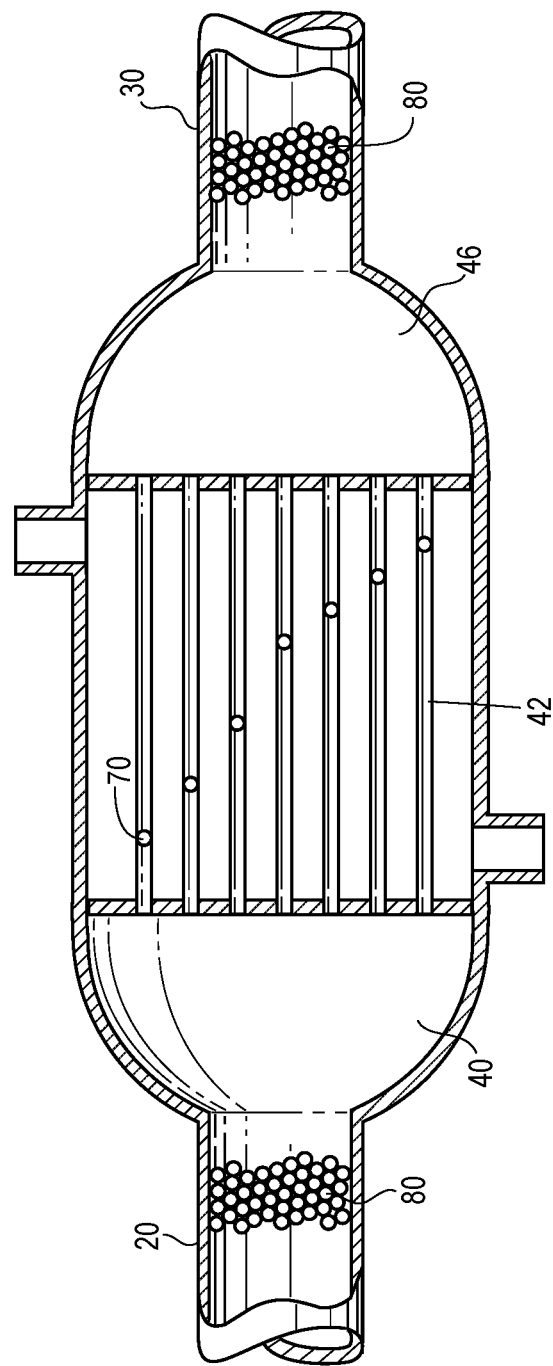
FIG. 7 is a schematic drawing showing a portion of the first pipe that includes a plurality of flow passages, the outlets of which are in fluid communication with a second pipe.

In some embodiments, the first pipe 20 and/or the second pipe 30 include a plurality of flow passages 42. FIG. 3 shows an example where the first pipe 20 includes a plurality of flow passages 42. FIG. 6 shows an example where the second pipe 30 includes a plurality of flow passages 42 and FIG. 7 shows an example where the first pipe 20 is fluidly connected to the inlet side of the plurality of flow passages 42 and the outlet side of the plurality of flow passages 42 are fluidly connected to the second pipe 30. Typically, the flow passages 42 (the tubes in the heat exchanger or pasteurizer) have an effective diameter 44 that is smaller than the first effective diameter 22 and/or the second effective diameter 32.

In some instances, the first pipe 20 is connected to an inlet manifold 40 that has a plurality of flow passages 42 terminating in an outlet manifold 44 fluidly connected to either another first pipe 20 or a second pipe 30. In other instances, the second pipe 20 is connected to an inlet manifold 40 that has a plurality of flow passages 42 terminating in an outlet manifold 44 fluidly connected to a second pipe 30. An example of such an inlet manifold 40 is the inlet to a multi-tube heat exchanger or pasteurizer. The heat exchanger or pasteurizer may be a straight through type, a U-tube type, or any other suitable type of heat exchanger or pasteurizer. Typically, the flow passages 42 (the tubes in the heat exchanger or pasteurizer) have an effective diameter 44 that is smaller than the first effective diameter 22 and/or the second effective diameter 32.

It is also contemplated that the flow passages 42 may be part of a membrane filtration system such as a ceramic membrane filtration system.

The piping system 10 has as least one inlet 90 where the pipe pigs 70 (described below) can be introduced into the system 10 and at least one outlet 92 where the pipe pigs 70 can be recovered. These locations can vary and can be at a vertical tube section, a horizontal section, or an angled tube section.

In addition, the inlet 90 may be used to introduce the second material 60 and any other subsequent material.

Turning now to FIG. 2, a section of the piping system 10 is schematically shown. This section is typical of the first pipe 20 and the section contains a plurality of pipe pigs 70. FIG. 5 shows another section of the piping section that is typical of the second pipe 30 and the section contains a plurality of pipe pigs 70.

The number of pipe pigs 70 will be sufficient to fill or substantially fill the cross section of the pipe (e.g., the cross section 24 of the first pipe 20 or the cross section 34 of the second pipe 30) to define a plug 80. The number of pipe pigs 70 provided will also be sufficient to extend an axial length to define a plug 80 having a leading edge 82 and a trailing edge 84. The leading edge 82 will be in contact with the first material 50 and the trailing edge 84 will be in contact with the second material 60. It will be appreciated that the leading edge 82 and the trailing edge 84 are not discrete defined boundaries; but rather as depicted in FIGS. 2, 3, and 5 can be considered to be the respective portions of the plug 80 where a column of pigs 70 extend from one side of the interior wall of the first pipe 20 or second pipe 30 to an opposite side of the interior wall of the respective first pipe 20 or second pipe 30.

The defined plug 80 will have an axial length sufficient to inhibit mixing of the first material 50 and the second material 60. The axial length will be such that the amount of the first material 50 present in the second material 60 at the trailing edge 84 is about 10% or less by volume. The axial length will be such that the amount of the second material 60 present in the first material 50 at the leading edge 82 is about 10% or less by volume. In some embodiments, the axial length is such that an amount of the first material 50 present in the second material 60 at the trailing edge 84 is about 10% or less by volume and such that an amount of the second material 60 present in the first material 50 at the leading edge 82 is about 10% or less by volume.

The pipe pigs 70 may have any suitable shape although it is contemplated that the pipe pigs 70 will be generally spherical so that when they agglomerate they will efficiently pack to form a plug 80 that will be effective to inhibit mixing of the first material 50 and the second material 60. Alternative shapes may include columnar shapes, bullet shape, and a shell-like shape, although as noted above, the pigs may have any particular shape so long as they can traverse the first pipe 20, the second pipe 30 and the flow passages 42.

The pipe pigs 70 will have a size that is less than the effective diameter of the first pipe 20 or the second pipe 30. In other words, if the pipe pigs 70 are spherical, they will have a diameter that is less than the effective diameter of the first pipe 20 or the second pipe 30. In addition, the pipe pigs 70 may have a size that is substantially the same as or slightly larger than the effective diameter of the flow passages 42 (i.e., substantially the same as or slightly larger than the effective diameter of the tubes of the heat exchanger or pasteurizer).

In some embodiments, the pipe pigs 70 are compressible so that they are slightly compressed when travelling through the flow passages 42. In other embodiments, the pipe pigs 70 are incompressible. The pipe pigs 70 may have an elastic body that may be formed of elastically deformable materials such as rubber or rubber type polymers and the like or a flexible foam material such as polyurethane (food grade or otherwise). The pipe pigs 70 in some embodiments may be coated with an inert material such as silicone, silicone-rubber, or other similar type of material.

It is also contemplated that the pipe pigs 70 have a size that is smaller or slightly smaller than the effective diameter of the flow passages 42 (i.e., smaller or slightly smaller than the effective diameter of the tubes of the heat exchanger or pasteurizer).

The pipe pigs 70 may be fluid impermeable or fluid permeable and, in use, the pipe pigs 70 may be all fluid impermeable, all fluid permeable, or some combination of each. The pipe pigs 70 may be hydrophobic or hydrophilic and, in use, the pipe pigs 70 may be all hydrophobic, all hydrophilic, or some combination of each.

In some embodiments, the pipe pigs 70 may be provided with a locating device 72, as illustrated in FIG. 4, so that the pipe pigs 70 can be tracked as they traverse the piping system 10. In this way the risk of inadvertent loss of pipe pigs 70 within the system can be alleviated, if necessary or desired. The locating device 72 may include a magnet, an RFID tag, or some other suitable locating device that can provide a means for locating the pipe pig 70 within the piping system 10.

In some embodiments, some or all the pipe pigs 70 may be made of a material such that the pipe pigs 70 are neutrally buoyant in the material in which the pipe pig 70 is immersed. For example, the pipe pigs 70 may be neutrally buoyant in either or both of the first material 50 or the second material 60. Neutrally buoyant refers to a condition in which the average density of the pipe pig 70 is substantially equal to the density of the fluid material in which the pipe pig 70 is immersed.

In some embodiments, the pipe pigs 70 may exhibit magnetic properties and, in this instance, the pipe pigs 70 may be made of a magnetic material or may be formed, at least partially, of a magnetic material. For example, the pipe pigs 70 may include a core of a magnetic material surrounded by a shell of a non-magnetic material that may be compressible or incompressible, fluid permeable or fluid impermeable. Alternatively, the pipe pigs 70 may be formed such that magnetic material particles are embedded within the structure of the pipe pigs 70 such that the pipe pigs, as a whole, exhibit magnetic properties.

Where the pipe pigs 70 exhibit magnetic properties, it is envisioned that the pipe pigs 70 will be attracted to each other to form the plug 80 or to re-form as a plug 80 after the pipe pigs 70 traverse the flow passages 42.

Turning back to FIG. 1, a first plurality of pipe pigs 70 are introduced or provided into the piping system in an amount sufficient to substantially fill a cross section 24 of the first pipe 20 and to define a plug 80 having a leading edge 82 and a trailing edge 84 as depicted in FIG. 2.

After the plurality of pipe pigs 70 are introduced or provided and a plug 80 is defined, the second material 60 is provided so that it is in contact with the trailing edge 84 of the plug 80. The second material 60 is moved to cause the plug 80 to move through the piping system 10. Because the second material 60 is pushing the plug 80 through the piping system 10, the plug 80 is able to move the first material 50 through the piping system 10 so that the piping system 10 no longer contains the first material 50.

Where the second material 60 is a fluid such as a liquid, the fluid may be provided so that it is moved at a velocity to inhibit settling of each pipe pig 70. In some instances, the fluid is moved at a velocity that exceeds a critical deposition velocity of the pipe pig 70. As a result, the tendency of the pipe pigs 70 to settle to the bottom of the pipe while being moved will be reduced. Accordingly, the formation of the plug 80 is maintained as the plug 80 is moved through the piping system 10.

When the plug 80 encounters a change in the size of the pipe or a change in direction of the pipe, the plug 80 is able to traverse such changes because the plug 80 is formed from a plurality of pipe pigs 70, each having a size that is substantially the same as or smaller than the effective diameter of the pipe or flow passage they are traversing (or when each pipe pig is larger than the effective diameter of the pipe or flow passage they are traversing, the pipe pig will be compressible so that it can traverse the pipe and/or flow passage). Advantageously, when the plug 80 encounters a heat exchanger, pasteurizer, or other piece of processing equipment, and, in particular, flow passages 42 or tube sections of such processing equipment, one or more plugs 70 enter each flow passage 42 or tube section to move the first material 50 out of each flow passage 42 or tube section to be replaced by the second material 60.

For example and referring particularly to FIG. 3, a portion of the piping system 10 is depicted. In this portion, a plug 80 is located in a first pipe section 20 and the first pipe section 20 includes a plurality of flow passages 42. In one embodiment, the first pipe section 20 is shown fluidly connected to an inlet manifold 40 that is in fluid communication with a plurality of flow passages 42 that terminate at an outlet manifold 46 that is in fluid communication with a first pipe 20.

Referring to FIG. 6, one of skill will appreciate that the second pipe section 30 includes a plurality of flow passages 42. In one embodiment, the second pipe section 30 is shown fluidly connected to an inlet manifold 40 that is in fluid communication with a plurality of flow passages 42 that terminate at an outlet manifold 46 that is in fluid communication with a second pipe 30.

Referring to FIG. 7, one of skill will appreciate that the first pipe section 20 includes a plurality of flow passages 42. In one embodiment, the first pipe section 30 is shown fluidly connected to an inlet manifold 40 that is in fluid communication with a plurality of flow passages 42 that terminate at an outlet manifold 46 that is in fluid communication with a second pipe 30.

As the plug 80 moves from the first pipe 20 toward the second pipe 30 (referring particularly to FIG. 7) and encounters the inlet manifold 40, the plug 80 will disperse into individual pipe pigs 70 such that at least one pipe pig 70 traverses or passes through each flow passage 42. Thereafter, the pipe pigs 70 will coalesce or agglomerate near the outlet manifold 46 so that the plug 80 will re-form. One of skill will appreciate that the same phenomenon will occur with the arrangement shown in FIGS. 3 and 6.

Without being bound by any particular theory, as the plug 80 approaches the flow passages 42 and one or more pipe pigs 70 enter a particular flow passage 42, a dynamic back pressure is generated in those flow passages 42 that contain one or more pipe pigs. This in turn will create an increase of flow in those flow passages 42 where no pipe pigs 70 are present or where the number of pipe pigs 70 in the flow passage 42 is less than others). As a result, there will be a greater tendency for pipe pigs 70 to enter those flow passages that do not contain a pipe pig 42 (or where the number of pipe pigs 70 in the flow passage 42 is less than others).

Where the pipe pigs 70 exhibit magnetic properties, when the pipe pigs 70 enter the flow passages 42, the pipe pigs 70 will experience a braking effect due to increased eddy currents (Foucault currents), which will induce a dynamic back pressure. This in turn will create an increase of flow in those flow passages 42 where no pipe pigs 70 are present or where the number of pipe pigs 70 in the flow passage 42 is less than others). As a result, there will be a greater tendency for pipe pigs 70 to enter those flow passages that do not contain a pipe pig 70 (or where the number of pipe pigs 70 in the flow passage 42 is less than others).

The re-formed plug 80 will have an axial length sufficient to inhibit mixing of the first material 50 and the second material 60. The axial length will be such that the amount of the first material 50 present in the second material 60 at the trailing edge 84 is about 10% or less by volume. The axial length will be such that the amount of the second material 60 present in the first material 50 at the leading edge 82 is about 10% or less by volume. In some embodiments, the axial length is such that an amount of the first material 50 present in the second material 60 at the trailing edge 84 is about 10% or less by volume and such that an amount of the second material 60 present in the first material 50 at the leading edge 82 is about 10% or less by volume.

In some embodiments of the described method, it is contemplated to provide a second plurality of pipe pigs 70 to form a second plug in the first pipe 20 subsequent to moving the first plug 80. The second plug will have a leading edge and a trailing edge such that the leading edge is in contact with the second material and the trailing edge is in contact with a third material. The third material may be the same as or different from the first material and the second material. The second plug is configured such that the amount of the second material present at the trailing edge of the second plug is about 10% or less by volume. In some embodiments, the second plug is configured such that the amount of the third material present at the leading edge of the second plug is about 10% or less by volume. In other embodiments, the second plug is configured is such that the amount of the second material present at the trailing edge of the second plug is about 10% or less by volume and the amount of the third material present at the leading edge of the second plug is about 10% or less by volume.

With the above in mind, the method may include providing a third, fourth, etc. plurality of pipe pigs to respectively form a third, fourth, etc. plug in the first pipe subsequent to providing a previous plug. Likewise, it is contemplated to provide a third, fourth, etc. material to move the respective third, fourth, etc. plug. In this regard, each material may be the same or different than the first, second, or any previous material.

The first plug 80 and second plug (and each succeeding plug, when present) may be axially separated by a distance that could be as long as the axial distance of the piping system, but will typically be some fraction of that, such as about 75%, about 50%, about 40%, about 30%, about 20%, about 10%, about 9%, about 8%, about 7%, about 6%, about 5%, about 4%, about 3%, about 2%, or about 1%.

The first plug 80 and any subsequent plugs are moved through the piping system 10 until they reach an outlet 92 of the piping system 10 where they are collected.

While a method has been described that is effective in minimizing material mixing, it is contemplated that the method will be effective to clean the interior walls of the piping system and associated flow passages 42. In this regard, one of skill will appreciate that because the plug 80 fills or substantially fills the entire cross-section of the first pipe section 20 and the second pipe section 30 (when present), the surfaces of one or more pipe pigs 70 will be in contact with the interior walls of the first pipe section 20 and the second pipe section 30 (when present). As a result, as the plug 80 is moved through the piping system 10, the interior walls of the first pipe section 20 and the second pipe section 30 (when present) will be "scrubbed" by one or more pigs 70, to effectively clean the interior surfaces of the first pipe section 20 and the second pipe section 30 (when present).

Furthermore, because at least one pipe pig 70 will traverse each flow passage 42, each flow passage 42 can be effectively cleaned.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A method of minimizing material mixing in a piping system during a transition between a first material and a second material, the piping system including a first pipe having a first effective diameter, the method comprising:
    providing a plurality of solid, compressible and/or elastically deformable, pipe pigs in the first pipe, the plurality of pipe pigs being sufficient to substantially fill a cross-section of the first pipe and to define a plug having a leading edge and a trailing edge such that the leading edge is in contact with the first material, wherein each pipe pig has a nominal size that is smaller than the first effective diameter; and
    moving the plug through the piping system by providing the second material in contact with the trailing edge of the plug,
    wherein mixing of the first material and the second material is inhibited by the plug.

2. The method of claim 1 further comprising a second pipe having a second effective diameter and being in fluid communication with the first pipe.

3. The method of claim 1 wherein the first pipe further includes a plurality of flow passages and wherein at least one pipe pig passes through each flow passage.

4. The method of claim 2 wherein the first pipe, the second pipe, or both the first and the second pipe further include a plurality of flow passages and wherein at least one pipe pig passes through each flow passage.

5. The method of claim 1 wherein each pipe pig is fluid impermeable.

6. The method of claim 1 wherein each pipe pig is fluid permeable.

7. The method of claim 1 wherein each pipe pig is neutrally buoyant in at least one of the first material and the second material.

8. The method of claim 1 wherein at least one of pipe pigs includes a locating device.

9. The method of claim 1 wherein at least some of the pipe pigs exhibit magnetic properties.

10. The method of claim 1 wherein the first material is a liquid.

11. The method of claim 10 wherein the second material is a liquid.

12. The method of claim 10 wherein the second material is a gas.

13. The method of claim 1 wherein the providing of the second material includes moving the second material at a velocity to inhibit settling of each pipe pig.

14. The method of claim 1 wherein the second material is water, a cleaning solution, a disinfecting solution, or a material to be processed in the piping system.

15. The method of claim 1 wherein the inhibition of the mixing is such that an amount of the first material present in the second material at the trailing edge is about 10% or less by volume.

16. The method of claim 15 wherein the inhibition of the mixing is such that an amount of the second material present in the first material at the leading edge is about 10% or less by volume.

17. The method of claim 1 wherein the inhibition of the mixing is such that an amount of the second material present in the first material at the leading edge is about 10% or less by volume.

18. The method of claim 1 further comprising subsequent to moving the plug, providing a second plurality of pipe pigs in the first pipe, the second plurality of pipe pigs being sufficient to substantially fill a cross-section of the first effective diameter and to define a second plug having a leading edge and a trailing edge such that the leading edge is in contact with the second material; and moving the second plug through the piping system by providing a third material in contact with the trailing edge of the second plug.

* * * * *